Figure 4:
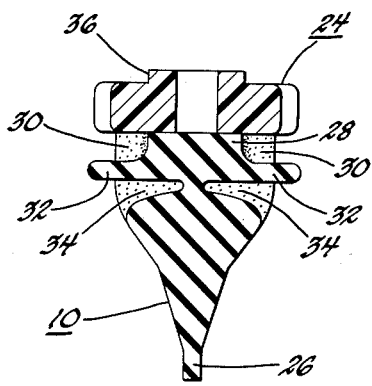

July 16, 1963
P. R. CONTANT ETAL
3,097,389
SQUEEGEE AND WIPER BLADE ASSEMBLY EMBODYING SAME
Filed Aug. 7, 1961
2 Sheets-Sheet 1
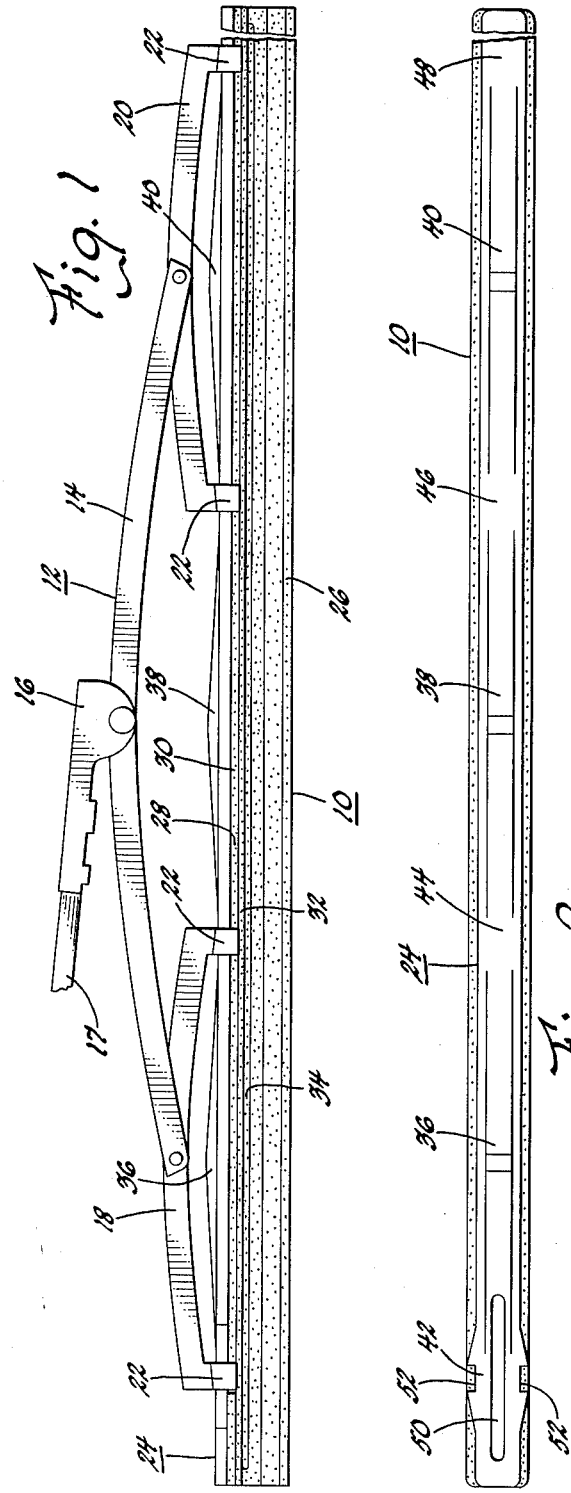
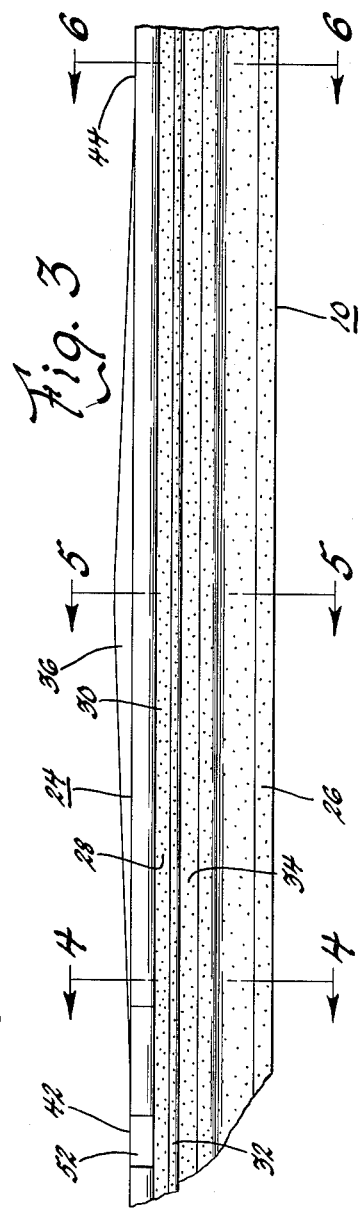
INVENTORS
Peter R. Contant
Vaughn H. Hardy
Elmer E. Reese
BY
THEIR ATTORNEY INVENTORS
Peter R. Contant
Vaughn H. Hardy
Elmer E. Reese
BY
W. E. Finlen
THEIR ATTORNEY 3,097,389
SQUEEGEE AND WIPER BLADE ASSEMBLY
EMBODYING SAME
Peter R. Contant, Vaughn H. Hardy, and Elmer E. Reese, all of Rochester, N.Y., assignors to General Motors Corporation, Detroit, Mich., a corporation of Delaware
Filed Aug. 7, 1961, Ser. No. 129,576
13 Claims. (Cl. 15—250.42)

This invention pertains to squeegees for windshield wiper blades, and particularly to a squeegee having a plastic retention portion which is adhesively bonded to an elastomeric wiping element. This application is a continuation-in-part of copending application Serial No. 83,006 filed January 16, 1961.

In the aforementioned patent application, a unitary elastomeric squeege is disclosed and claimed comprising a retention portion formed of a relatively hard elastomer and a wiping portion formed of a relatively soft elastomer. In order to distribute wiper arm applied pressure substantially uniformly throughout the length of the squeegee, the retention portion is of varying thickness with the thickness being a maximum midway between the spans of the pressure applying superstructure and a minimum at the points of pressure application. In the present invention the retention portion of the squeegee is formed of a relatively hard, resiliently flexible plastic material. The resultant squeegee has all of the advantages of the unitary squeegee in the aforementioned copending application in that it is quiet in operation due to the elimination of metal to metal connections between the superstructure and the squeegee; reduces the likelihood of windshield scratching; and substantially reduces the cost of manufacture of windshield wiper blade assemblies.

Accordingly, among our objects are the provision of a squeegee having a retention portion of plastic and an elastomeric wiping portion bonded thereto; the further provision of a squeegee having a plastic retention portion of nonuniform cross-sectional area for obtaining uniform distribution of pressure throughout the length thereof; and the still further provision of a wiper blade assembly including a squeegee and a pressure applying superstructure connected thereto at longitudinally spaced apart points wherein the squeegee embodies a plastic retention portion for uniformly distributing the applied pressure throughout the length thereof.

The aforementioned and other objects are accomplished in the present invention by using a tough, resilient, polymer plastic which can be readily molded to the desired configuration, and adhesively bonding the plastic retention portion to a wiping element of rubber or other elastomeric material. By forming the retention portion to have a greater width than thickness, the resultant squeegee is quite flexible in a plane normal to the surface to be wiped, while being substantially inflexible, or rigid, in a plane parallel to the surface to be wiped. The squeegee may be connected with any suitable type of pressure distributing linkage, or superstructure, to form a wiper blade assembly. This superstructure may be of any known form, and thus may comprise a plurality of pivotally interconnected yokes, a plurality of stacked levers, or a combination of yokes and levers, for applying wiper arm pressure at a plurality of longitudinally spaced apart points along the length of the squeegee. In order to distribute the applied wiper arm pressure uniformly, the retention portion is formed with ribs of varying thickness, with the thickest sections being located midway between the points of pressure application.

Further objects and advantages of the present invention will be apparent from the following description, reference being had to the accompanying drawings, wherein a preferred embodiment of the present invention is clearly shown.

Figure 5:
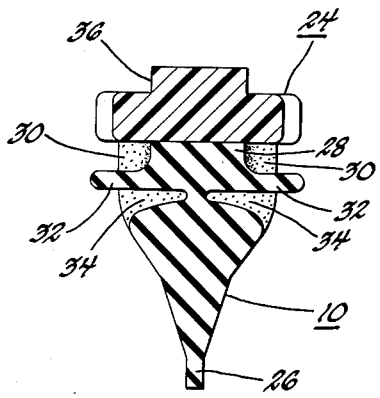
Figure 6:
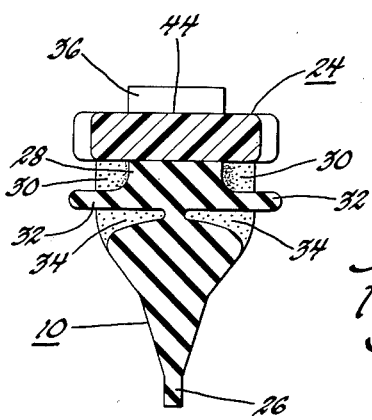

In the drawings:
FIGURE 1 is a longitudinal view, in elevation, of a windshield wiper blade assembly constructed according to the present invention.
FIGURE 2 is a plan view of the improved squeegee.
FIGURE 3 is an enlarged fragmentary view, in elevation, of a portion of the squeegee shown in FIGURE 2.
FIGURES 4, 5 and 6 are sectional views taken along lines 4—4, 5—5 and 6—6 of FIGURE 3.

With particular reference to FIGURE 1, a windshield wiper blade assembly is shown comprising a squeegee 10 to be described in detail hereinafter, and a pressure applying superstructure 12 including a channel-shaped primary yoke 14 having a centrally located arm attaching clip 16 pivotally connected thereto for receiving pressure from a wiper arm 17. A pair of channel-shaped secondary yokes 18 and 20 are pivotally connected to opposite ends of the primary yoke 14, opposite ends of the secondary yokes 18 and 20 having claws 22 for straddling the retention portion of the squeegee 10. The superstructure is thus seen to apply wiper arm pressure to four longitudinally spaced apart points along the length of the squeegee, the spans between the pressure points being of substantially equal length.

As seen in FIGURES 2 through 6, the squeegee comprises an elongate elastomeric body of rubber and a stiff plastic retention portion 24 coextensive with and adhesively bonded thereto. The elastomeric body has a freely flexible wiping lip 26 along one edge and an upstanding rib 28 along the opposite edge and to which the plastic retention portion 24 is adhesively bonded. As seen particularly in FIGURES 4 through 6, a pair of coplanar grooves 30 are formed between the plastic retention portion 24 and flanges 32 on the elastomeric body for receiving the claws of the pressure applying superstructure. The grooves 30 can be closed adjacent the heel, or inner, end of the squeegee as shown in FIGURE 1. In order to permit the wiping lip to assume the proper drag position as it is moved across the surface being wiped, a pair of flexure grooves 34 terminating short of the ends of the elastomeric wiping element are formed beneath the flanges 32.

The retention portion 24 has a greater width than thickness, and consequently while the retention portion is readily flexible in a plane normal to the surface to be wiped it is substantially rigid in a plane parallel thereto. Moreover, in order to assure a substantially uniform distribution of applied wiper arm pressure, the retention portion 24 is of nonuniform thickness throughout substantially its entire length. This is accomplished by forming upstanding ribs 36, 38 and 40 on the upper surface of the retention portion between the marginal edges thereof, the ribs being of varying thickness and tapering substantially uniformly from the center towards both ends. Thus, the retention portion has its thinnest sections, these being the nominal thickness of the retention portion, at the points of pressure application, namely points 42, 44, 46 and 48, and has its sections of maximum thickness located midway between these pressure applying points. By construction of the retention portion 24 in this manner, pressure will be distributed substantially uniformly to the wiping lip of the squeegee between each span from the pressure applying superstructure. It is to be understood that the ribs or sections of nonuniform thickness may be made in a variety of ways and hence the specifically disclosed embodiment is only by way of example.

The superstructure is shown interlocked with the retention portion 24 in accordance with the teachings of copending application Serial No. 82,810 filed January 16, 1961, in the name of Latone and assigned to the assignee of this invention. Thus, an elongate slot 50 is formed in the retention portion adjacent one end thereof, the outer marginal edges of the retention portion being tapered in the area of the slot 50 and notched at 52. The claw 22 of the inner, or heel, yoke 18 of the pressure applying superstructure is adapted to be slidably received within the notches 52 of the marginal edges of the retention portion, and can be readily detached therefrom by compressing the marginal edges towards each other and sliding the superstructure relative to the squeegee.

To assemble the superstructure with the squeegee it is only necessary to engage the claws in straddling relation with the retention portion 24 and effect relative longitudinal movement between the superstructure and the squeegee so that the end claw 22 of the heel yoke 18 will become interlocked with the notches 52.

In selecting a plastic material for the retention portion 24 the following factors must be taken into consideration. Since the retention portion must flex to conform the squeegee to surfaces of varying curvature while remaining substantially inflexible in a lateral direction, it must have a high flexural modulus, or stiffness. Furthermore, since wiper blades must be used under conditions of widely varying temperatures, the retention portion must be flexible within the temperature range of −40° F. to 180° F. In addition to the required resiliency, the plastic must be tough and have sufficient fatigue strength to withstand repeated flexing in opposite directions such as occurs during use of a wiper blade as it is moved across a surface of varying curvature. In addition, the plastic must not take a permanent set under applied wiper arm pressure. This last requirement of not taking a permanent set under applied wiper arm pressure is extremely important since it is well recognized that wiper blades are only infrequently used and normally are maintained in contact with the windshield adjacent the lower rail thereof when not in use. If the plastic retention portion should take a permanent set conforming to the curvature of the windshield in this parked position, the blade would not satisfactorily wipe surfaces of varying curvature and thus would be useless.

A plastic which has been found suitable for use as the retention portion of a squeegee is known in the trade as "Delrin" which is a thermoplastic polymer of a linear acetal resin consisting of polymerized formaldehyde (polyoxymethylene) molecular chains of great length normally averaging more than 1000 formaldehyde units. The physical properties and chemical composition of this thermoplastic polymer are described in the Society of Plastic Engineers Journal of April, 1958. Another plastic material which has been found suitable for use as the retention portion of a squeegee is known in the trade as "Cycolac" which is a thermoplastic tri-polymer of acrylonitrile-butadiene-styrene. "Cycolac" has a uniform molecular structure wherein the three constituents are polymerized together.

It has been found that these hard plastic materials can be bonded to a rubber wiping element with commercially available adhesives to form a squeegee of superior wiping ability as compared to conventional metal backed squeegees now in use. In addition to the fact that squeegees constructed according to the present invention produce better results than conventional metal backed squeegees, the cost of manufacture is appreciably less in that the plastic retention portion can be adhesively bonded to the rubber wiping element in a simple and straightforward manner, and the cost of the molded plastic retention portion is appreciably less than conventional stainless steel backing strips.

While the embodiment of the invention as herein disclosed constitutes a preferred form, it is to be understood that other forms might be adopted.

What is claimed is as follows:

1. A squeegee comprising an elongate, freely flexible body of elastomeric material having a wiping lip along one edge, and a stiff, resilient plastic retention portion coextensively bonded to the opposite edge of said elastomeric body, said retention portion having a plurality of aligned sections of nonuniform flexibility in a plane normal to the surface to be wiped, each section having maximum flexibility at its ends and minimum flexibility midway between its ends.

2. A squeegee comprising an elongate, freely flexible elastomeric body having a wiping lip along one edge, and a stiff, resiliently flexible plastic retention portion coextensively bonded to the opposite edge of said elastomeric body, said retention portion having a greater width than thickness such that the squeegee has greater flexibility in a plane normal to the surface being wiped than in a plane parallel to such surface, said retention portion also having a plurality of aligned sections of nonuniform flexibility in the plane normal to the surface to be wiped, each section having maximum flexibility at its ends and minimum flexibility midway between its ends.

3. A squeegee comprising an elongate, freely flexible elastomeric body having a wiping lip along one edge and an upstanding rib along the opposite edge, said body having a pair of coplanar flanges disposed between said rib and said wiping edge, and a stiff, resilient plastic retention portion coextensively bonded to the upper surface of said rib, said retention portion having a width greater than the width of said rib throughout the major portion of its length so as to define a pair of coplanar grooves with the flanges of said elastomeric body extending throughout the major portion of the length thereof, said retention portion also having a plurality of aligned sections of nonuniform flexibility in a plane normal to the surface to be wiped, each section having maximum flexibility at its ends and minimum flexibility midway between its ends.

4. A squeegee comprising an elongate, freely flexible elastomeric body having a wiping lip along one edge and an upstanding rib along the opposite edge, and a stiff, resiliently flexible plastic retention portion coextensively bonded to said upstanding rib and having a width exceeding the width of said rib throughout the major portion of the length of said body, said retention portion having a plurality of aligned sections of nonuniform flexibility in a plane normal to the surface to be wiped, each section having maximum flexibility at its ends and minimum flexibility midway between its ends.

5. A squeegee comprising an elongate, freely flexible elastomeric body having a wiping lip along one edge and an upstanding rib along the opposite edge, and an elongate retention portion of stiff, resiliently flexible plastic material coextensive with and coextensively bonded to the upstanding rib, portion of this line and insert said retention portion having a plurality of aligned sections of nonuniform thickness so as to be nonuniformly flexible in a plane normal to the surface to be wiped, each section having a minimum thickness at its ends and a maximum thickness midway between its ends.

6. A squeegee comprising an elongate, freely flexible elastomeric body having a wiping lip along one edge and an upstanding rib along the opposite edge, and a stiff, resiliently flexible plastic retention portion coextensively bonded to said upstanding rib, said retention portion having a plurality of aligned ribs of nonuniform thickness so as to be nonuniformly flexible in a plane normal to the surface to be wiped, the thickness of each rib being a maximum adjacent its center and progressively decreasing to a minimum at its ends.

7. The squeegee set forth in claim 6 wherein said retention portion has three of said ribs substantially aligned with each other and longitudinally spaced apart along the length thereof, and wherein said ribs are disposed inwardly of the marginal edges of said retention portion.

8. The squeegee set forth in claim 6 wherein said retention portion consists of a polymerized formaldehyde.

9. The combination set forth in claim 6 wherein said retention portion consists of a tri-polymer of styrene-butadiene-acrylonitrile.

10. A wiper blade assembly including an elongate squeegee comprising a freely flexible elastomeric body having a wiping lip along one edge and a stiff, resiliently flexible plastic retention portion coextensive with and coextensively bonded to the opposite edge of said elastomeric body, said retention portion having a plurality of aligned sections of nonuniform flexibility in a plane normal to the surface to be wiped, each section being disposed inwardly of the marginal edges of said retention portion and having maximum flexibility at its ends and minimum flexibility midway between its ends, and a pressure distributing linkage comprising a plurality of relatively movable members having connections with the marginal edges of said retention portion only at longitudinally spaced points of maximum flexibility therealong.

11. A wiper blade assembly including an elongate squeegee comprising a freely flexible elastomeric body having a wiping lip along one edge and a stiff, resiliently flexible plastic retention portion coextensively bonded to the opposite edge of said elastomeric body, and a pressure distributing linkage comprising a plurality of relatively movable members having connections with said retention portion at longitudinally spaced points therealong, said retention portion having a plurality of aligned sections of nonuniform flexibility in a plane normal to the surface to be wiped, each section having its greatest flexibility at the location of the connections between said movable members and said retention portion.

12. A wiper blade assembly including, an elongate squeegee comprising a freely flexible elastomeric body having a wiping lip along one edge and a stiff, resiliently flexible plastic retention portion coextensively bonded to the opposite edge of said elastomeric body and having exposed marginal edges, and a pressure applying superstructure connected to the exposed marginal edges of said retention portion at a plurality of longitudinally spaced apart points, said retention portion having a plurality of aligned sections of nonuniform thickness located inwardly of the marginal edges thereof so as to be nonuniformly flexible in a plane normal to the surface to be wiped, the thickness of each section being a maximum midway between the points of connection between the superstructure and the retention portion and a minimum at said points of connection.

13. A wiper blade assembly including, an elongate squeegee comprising a freely flexible elastomeric body having a wiping lip along one edge and a stiff, resiliently flexible plastic retention portion coextensively bonded along the opposite edge of said elastomeric body and having exposed marginal edges, and a pressure applying superstructure connected to the exposed marginal edge of said retention portion at a plurality of longitudinally spaced points, the spans between the several points of connection between said superstructure and said retention portion being of substantially equal length, said retention portion having a plurality of aligned upstanding ribs of nonuniform thickness between said spans and disposed inwardly of said marginal edges so as to be nonuniformly flexible in a plane normal to the surface to be wiped, the thickness of said ribs being a maximum midway of each span whereby arm pressure applied to said superstructure will be substantially uniformly distributed throughout the length of said squeegee.

References Cited in the file of this patent
UNITED STATES PATENTS

| | | |
|---|---|---|
| 2,814,821 | Wallis | Dec. 3, 1957 |
| 3,006,016 | Anderson | Oct. 31, 1961 |
| 3,029,460 | Hoyler | Apr. 17, 1962 |

FOREIGN PATENTS

| | | |
|---|---|---|
| 1,124,116 | France | June 25, 1956 |